(12) United States Patent
Cordeiro

(10) Patent No.: US 6,895,835 B2
(45) Date of Patent: May 24, 2005

(54) METHOD OF IMPROVING PERFORMANCE IN A MOTOR-DRIVEN SYSTEM

(76) Inventor: Alan M. Cordeiro, 1515 Chalmers Dr., Ann Arbor, MI (US) 48104

(*) Notice: Subject to any disclaimer, the term of this patent is extended or adjusted under 35 U.S.C. 154(b) by 0 days.

(21) Appl. No.: 10/442,037

(22) Filed: May 20, 2003

(65) Prior Publication Data

US 2003/0192400 A1 Oct. 16, 2003

Related U.S. Application Data

(63) Continuation of application No. 09/956,529, filed on Sep. 19, 2001, now abandoned.
(60) Provisional application No. 60/233,784, filed on Sep. 19, 2000.

(51) Int. Cl.⁷ .............................. G01L 5/13; G01L 5/28
(52) U.S. Cl. .................................... 74/665 A; 73/118.1
(58) Field of Search ........................... 475/5; 74/665 A, 74/665 B, 665 D, 665 E; 73/118.1, 123, 126, 862, 31

(56) References Cited

U.S. PATENT DOCUMENTS

| | | | | |
|---|---|---|---|---|
| 1,669,107 A | * | 5/1928 | Umansky | 318/625 |
| 1,691,853 A | * | 11/1928 | Mollett | 310/112 |
| 2,463,349 A | * | 3/1949 | Baner | 310/112 |
| 2,561,131 A | * | 7/1951 | Oropeza | 310/112 |
| 3,168,665 A | * | 2/1965 | Holper | 310/112 |
| 3,979,652 A | * | 9/1976 | Faxon | 318/254 |
| 4,050,299 A | * | 9/1977 | Maxwell | 73/126 |
| 4,292,572 A | * | 9/1981 | Ivy | 318/52 |
| 4,501,139 A | * | 2/1985 | Petersen | 73/118.1 |
| 4,753,130 A | * | 6/1988 | Rode | 74/665 B |
| 5,043,617 A | * | 8/1991 | Rostron | 310/112 |
| 5,072,522 A | * | 12/1991 | Stott et al. | 33/503 |
| 5,085,071 A | * | 2/1992 | Mizushina et al. | 73/118.1 |
| 5,323,644 A | * | 6/1994 | Schaefer | 73/117 |
| 5,387,818 A | * | 2/1995 | Leibowitz | 290/1 R |
| 5,477,740 A | * | 12/1995 | Shioya et al. | 73/118.1 |
| 5,534,737 A | * | 7/1996 | Nishimura | 310/112 |
| 5,621,168 A | * | 4/1997 | Kim et al. | 73/123 |
| 5,704,250 A | * | 1/1998 | Black | 74/89.3 |
| 6,387,004 B1 | * | 5/2002 | Parrish | 475/5 |

* cited by examiner

Primary Examiner—Sherry Estremsky
(74) Attorney, Agent, or Firm—Young & Basile, P.C.

(57) ABSTRACT

A method is disclosed for improving the performance attainable in a motor-driven system of the type characterized by a single motor driving an output shaft operatively coupled to a motor-driven device, the single motor characterized by a first power and a first peak rate of acceleration, the method comprising: Providing at least two motors in place of the single motor, each of the at least two motors being characterized by a second peak rate of acceleration significantly greater than the first peak rate of acceleration, and the at least two motors further characterized by a combined power that is at least equivalent to the first power of the single motor; and operatively coupling the at least two motors in parallel to a common output shaft driving the motor-driven device such that the second peak rate of acceleration is efficiently translated to the common output shaft.

6 Claims, 8 Drawing Sheets

METHOD OF IMPROVING PERFORMANCE IN A MOTOR-DRIVEN SYSTEM

RELATED APPLICATION

This application is a continuation of U.S. patent application Ser. No. 09/956,529, filed Sep. 19, 2001 now abandoned, which claims the benefit of U.S. Provisional Patent Application Ser. No. 60/233,784, filed Sep. 19, 2000.

FIELD OF THE INVENTION

The present invention relates to motor-driven systems, and more particularly to a method of improving performance in a single-motor-driven system by providing at least two smaller motors in place of the single, larger motor, each of the at least two motors being characterized by a peak rate of acceleration significantly greater than that of the single, larger motor, and wherein the at least two smaller motors are operatively coupled in parallel to a common output shaft, the operative coupling adapted to efficiently translate the second peak rate of acceleration to the motor-driven device. The inventive method has numerous applications, including motion control applications, factory automation, testing and evaluation of automobile systems, such as anti-lock braking systems and transmission systems, etc.

BACKGROUND

When large values of torque and power are required in a motor-driven system, the conventional solution is to use one, large, and hence more powerful motor in place of a smaller and less powerful motor. Due to the physical constraints imposed on motor design and manufacture, however, the ratio of torque to inertia deteriorates as motor size increases, resulting in a lower peak acceleration rates with increased motor size. Thus, while the torque and power of the larger engine may be more suited to meet the requirements of the motor-driven system, the peak acceleration rate for the motor that may be unacceptable for the system. To overcome this undesired side effect, it has been conventional practice to modify motor design, for instance through the use of state-of-the-art materials and motor construction techniques, in order to maximize the performance achievable in a single motor. However, these practices are oftentimes limited in their ability to achieve the desired or lower equivalent inertia, with unsatisfactory results, particularly in motor-driven systems where there is a requirement for higher peak acceleration rates, such as systems demanding rapid changes in motion. There consequently remains a continuing need to improve the performance of motor-driven systems beyond that level presently attainable.

SUMMARY

The present invention addresses and solves the problems discussed above, and encompasses other features and advantages, by providing a method for improving the performance attainable in a motor-driven system of the type characterized by a single motor driving an output shaft operatively coupled to a motor-driven device, the single motor characterized by a first power and a first peak rate of acceleration, the method comprising:

Providing at least two motors in place of the single motor, each of the at least two motors characterized by a second peak rate of acceleration significantly greater than the first peak rate of acceleration, and the at least two motors further characterized by a combined power that is at least equivalent to the first power of the single motor; and operatively coupling the at least two motors in parallel to a common output shaft that is, in turn, operatively coupled to the motor-driven device, the operative coupling adapted to efficiently translate the second peak rate of acceleration to the motor-driven device.

According to one embodiment of this invention, the method is adapted for controlling the motion of a motor-driven device between at least first and second rates of travel, the method comprising providing at least two motors operatively coupled in parallel to a common output shaft, the common output shaft being operatively coupled to a motor-driven device, and wherein the at least two motors are each characterized by a peak rate of acceleration significantly greater than the peak rate of acceleration of a comparable larger motor of equivalent power.

These and other features and advantages of the present invention will become apparent to those skilled in the art upon reference to the following description and drawings.

BRIEF DESCRIPTION OF THE DRAWINGS

The description herein makes reference to the accompanying drawings, wherein like reference numerals refer to like parts throughout the several views, and wherein.

DESCRIPTION OF THE ILLUSTRATED EMBODIMENTS

Figure 1:
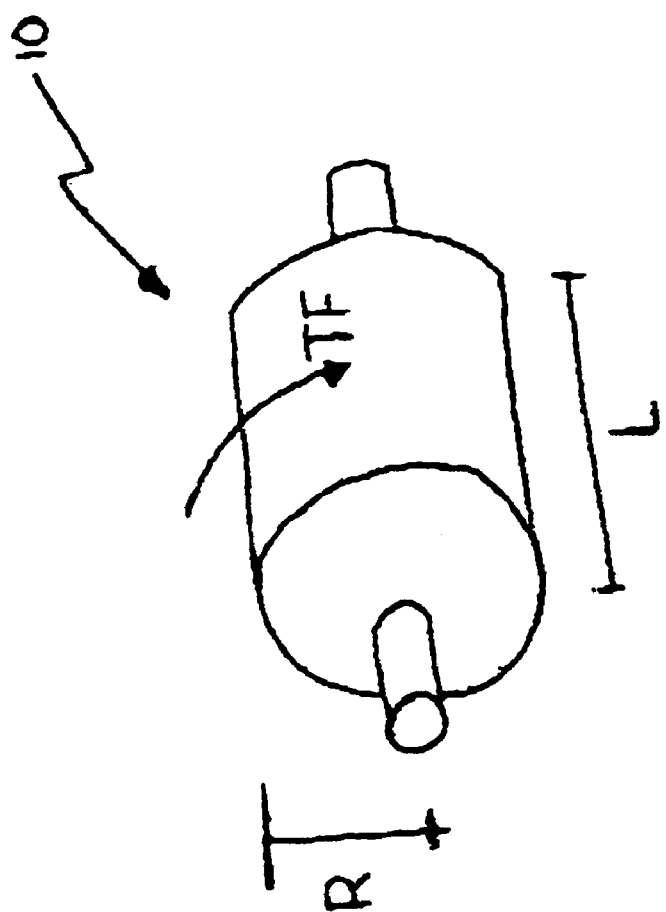
FIG. 1 diagrammatically represents the rotor of a servo-motor.

Referring now to the drawings, the present invention will be seen to most generally comprise a method for improving the performance attainable in a motor-driven system of the type characterized by a single motor driving an output shaft operatively coupled to a motor-driven device, the single motor characterized by a first power and a first peak rate of acceleration, the method comprising: Providing at least two motors in place of the single motor, each of the at least two motors characterized by a second peak rate of acceleration significantly greater than the first peak rate of acceleration, and the at least two motors further characterized by a combined power that is at least equivalent to the first power of the single motor; and operatively coupling the at least two motors in parallel to a common output shaft that is, in turn, operatively coupled to the motor-driven device, the operative coupling adapted to efficiently translate the second peak rate of acceleration to the motor-driven device. Resultantly, as has been surprisingly and unexpectedly discovered, the single output shaft is characterized by a second peak rate of acceleration significantly greater than the first peak rate of acceleration; that is, by combining multiple smaller motors in parallel, the higher individual performance of the physically smaller units translates into improved performance of the larger combined unit, while still providing the required torque and power for the motor-driven system.

The peak acceleration rate of a motor directly relates to the ratio of peak torque to rotor inertia by the following formula:

Peak Acceleration Rate (radians/sec$^2$)=peak torque/rotor inertia (in compatible units)

By way of example of the foregoing relationship, Tables I, II, and III represent the peak acceleration rate figures of different size, conventional servo-motors, all commercially available. More particularly, Table I shows the performance characteristics of a family of permanent magnet servo-motors available commercially from MTS Systems Corporation, Automation Division of New Ulm, Minn.; Table II shows the performance characteristics of a family of permanent magnet servo-motors commercially available from Powertec Industrial Motors of Rock Hill, S.C.; and Table III shows the performance characteristics of family of squirrel cage induction motors commercially available from Baldor Motors and Drives of Fort Smith, Ark.

TABLE I

| Description | Power (kW) | Part Number | Peak Torque (nm) | Inertia (kg-m$^2$) | Acceleration Rate (rad/sec$^2$) | Speed (rpm) | Acceleration Rate adjusted to 1000 rpm (rad/sec$^2$) |
| --- | --- | --- | --- | --- | --- | --- | --- |
| 2" servomotor | 0.35 | 664ASF | 3.4 | 0.0000179 | 189,944 | 5000 | 37,988 |
| 3" servomotor | 1.46 | 893ASG | 15.5 | 0.000154 | 100,650 | 3600 | 27,958 |
| 4" servomotor | 3.4 | 1143CSJ | 45.7 | 0.00107 | 42,710 | 3000 | 14,236 |
| 6" servomotor | 9.3 | 1424CSJ | 122.2 | 0.00397 | 30730 | 2800 | 10,975 |
| 8" servomotor | 26.7 | 1904CSJ | 370 | 0.0150 | 24,666 | 2400 | 10,277 |
| 12" servomotor | 54.8 | 3204B | 853.4 | 0.1602 | 5.327 | 1800 | 2,959 |

TABLE II

| Description | Power (kW) | Part Number | Peak Torque (nm) | Inertia (kg-m$^2$) | Acceleration Rate (rad/sec$^2$) | Speed (rpm) | Acceleration Rate adjusted to 1000 rpm (rad/sec$^2$) |
| --- | --- | --- | --- | --- | --- | --- | --- |
| 7" servomotor | 36.5 | E184E2 | 454 | 0.0193 | 23,523 | 3600 | 6534 |
| 8.25" servomotor | 69 | E218E2 | 976 | 0.0483 | 20,207 | 3600 | 5613 |
| 11" servomotor | 167 | E259E4 | 2263 | 0.456 | 4,962 | 2000 | 2481 |
| 12.6" servomotor | 286 | E32DE2 | 4041 | 0.90 | 4,490 | 1750 | 2565 |

TABLE III

| Description | Power (HP) | Part Number | Torque at Base Speed (nm) | Inertia (kg-m$^2$) | Acceleration Rate (rad/sec$^2$) | Speed (rpm) | Acceleration Rate adjusted to 1000 rpm (rad/sec$^2$) |
| --- | --- | --- | --- | --- | --- | --- | --- |
| 8.5" servomotor | 5 | 7624M | 23.7 | 0.009 | 2,633 | 1500 | 1,755 |
| 10.3" servomotor | 20 | 7660M | 95 | 0.075 | 1,267 | 1500 | 845 |
| 12.6" servomotor | 50 | 8080M | 237 | 0.267 | 887 | 1500 | 591 |

From these Tables it will particularly be appreciated how the peak acceleration rate decreases with an increase in motor size; for instance, Table I evidences a factor of reduction of 12 times between the peak acceleration rate of the 2 inch and 12 inch servo-motors commercially available from MTS Systems Corporation.

Without being bound by any particular theory, the operative principles underlying the above relationship and the method of this invention may be better understood with reference to FIG. 1.

The following discussion assumes that, as to all motors within a single motor family (i.e., successively larger motors from the same manufacturer), such motors: use similar materials and cooling methods; have comparable magnetic flux densities, using premium magnetic core materials, and, in the case of permanent magnets, identical premium (rare-earth) magnetic alloys, to optimize performance; and have comparable current densities.

FIG. 1 illustrates diagrammatically the rotor of an exemplary servo-electric motor 10, the tangential force TF produced on the rotor surface is dependent on flux and current, and that force TF will be proportional to the outer surface area of the rotor 10. Thus, the tangential force TF may be expressed as:

$$TF \propto 2\pi * R * L$$

where R is the radius of the rotor, and L is the length of the rotor, in like units.

Since the rotor radius R and length L both increase proportionally as the size of the rotor increases, tangential force TF is proportional to $R^2$; in other words, the tangential force TF increases proportionally to the square of the radius R.

Since torque is a product of the tangential force TF and the length of the lever arm, the tangential force is proportional to the cube of the radius; expressed otherwise:

$$\text{Torque} \propto R^3$$

Increases in rotor size also effect rotor inertia. Treating the rotor as a disk, the inertia thereof is dependent on the rotor's mass times the square of the radius of the rotor; expressed differently:

$$\text{Inertia} \propto \text{Mass} * R^2$$

Since the rotor's mass is generally proportional to its volume (presuming a relatively constant rotor density as a consequence of the use of similar magnetic materials), and because the magnetic materials are identical, rotor inertia is proportional to rotor volume times the square of the radius; in other words:

$$(2\pi * R^2 * L) * R^2$$

And given that the rotor length changes proportionally to it's radius, so that inertia is proportional to the fifth power of the radius, or:

$$\text{Inertia} \propto R^5$$

Hence, the ratio of torque to inertia, as a function of motor radius, may be expressed as follows:

$$\text{Torque/Inertia} = 1/R^2$$

In other words, the ratio of torque to inertia varies inversely as the square of the radius of the rotor.

Figure 2:
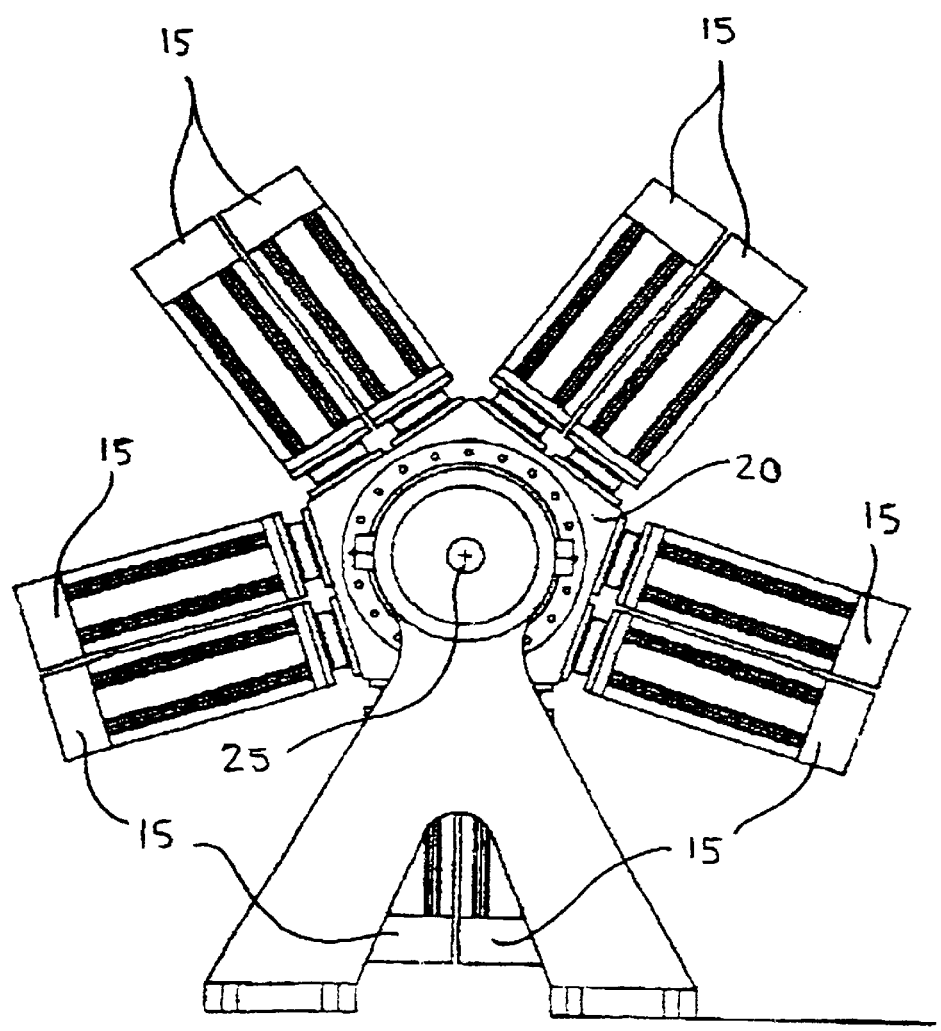
FIG. 2 shows one exemplary means for combining multiple motors in accordance with the present invention.
Figure 3:
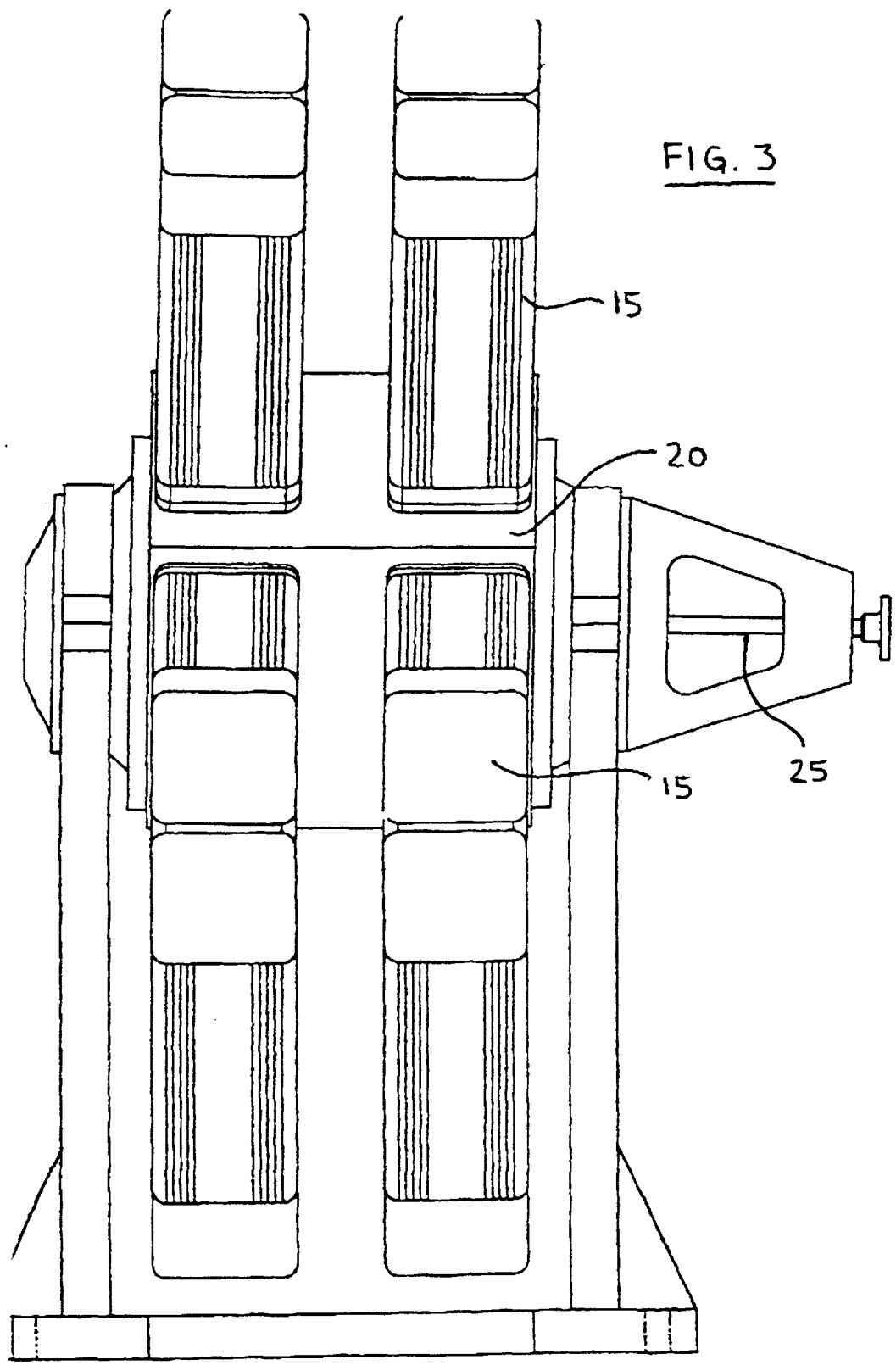
FIG. 3 is a lateral view of the combined motor arrangement of FIG. 2.
Figure 4:
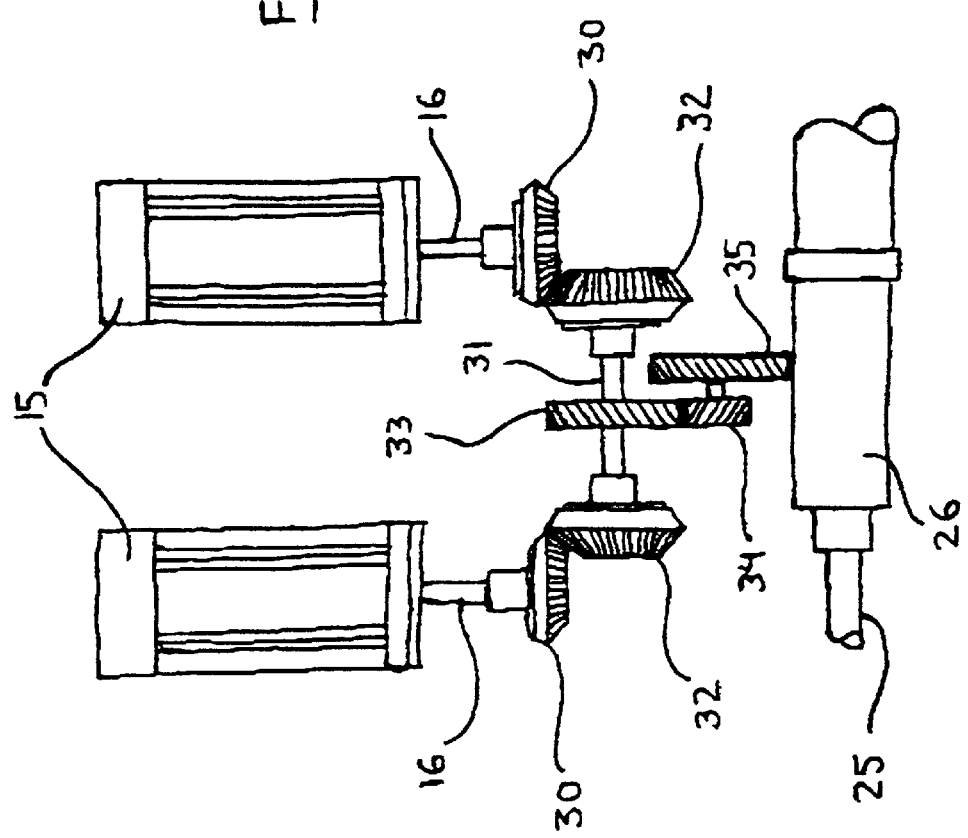
FIG. 4 schematically depicts the gearing means employed to combined the multiple motors of the motor arrangement of FIGS. 2 and 3.

Referring now to FIGS. 2 through 4, an exemplary means for combining multiple motors into one system in accordance with the present invention is shown. Turning first to FIGS. 2 and 3, the embodiment more particularly contemplates the provision of twenty 8-inch servo motors 15 combined with a geartrain system, embodied in a gearbox 20, that efficiently combines the performance of all twenty motors 15 on to one common output shaft 25 operatively connected to a motor-driven device (not shown). The motors 15 are grouped in pairs and arranged radially about the gearbox 20, with one pair of motors 15 on each of five sides of the gearbox 20 as shown.

Turning now to FIG. 4, the arrangement of gears between an exemplary pair of motors 15 and the common output shaft 25 is shown schematically. It will be understood that the following gear arrangement is repeated along the length of the common output shaft 25 for each of the ten pair of motors 15 in the exemplary embodiment.

Each motor 15 in the pair includes a 47-tooth output gear 30 provided on the motor output shaft 16, the two output gears 30 each driving a common shaft 31 via one of two 30-tooth driven gears 32 provided on the common shaft 31. The common shaft 31 includes a third, 71-tooth gear 33 that, in turn, drives a 29-tooth driven gear 34 provided on a further gear sub-assembly. The gear sub-assembly includes a larger, 71-tooth driving gear 35 which drives, in turn, a further 29-tooth gear 26 provided on the common output shaft 25.

The driving gears 35 of each of the gear sub-assemblies are disposed about the rotational axis of the common output shaft 25 along its length, corresponding to the placement of the pairs of motors as shown in FIGS. 2 and 3. Likewise, a driven gear 26 such as shown in FIG. 4 is positioned along the length of the common output shaft 25 at a position corresponding to the position of each gear sub-assembly.

The orientation of the gears in the foregoing arrangement is selected so as to neutralize thrust on the common output shaft 25; that is, five pairs of motors 15 have driving gears 30 that rotate in a direction that develops thrust on the common output shaft 25 in a first direction, while the remaining five pairs of motors 15 have driving gears 30 that rotate in the opposite direction to develop thrust on the common output shaft 25 in a second, opposite direction.

The gear assembly design of this exemplary embodiment contributes to minimized loading on the common output shaft 25, and so is well-suited to the present invention. Of course, numerous means of efficiently paralleling multiple motors may be employed, including, without limitation, combining gearbox systems with multiple input shafts and one or more main output shafts, a pulley and belt system with multiple input pulleys and belts finally combining on one or more main output shafts, and a friction disk system, such as rubber wheels, where multiple motors drive one or more main output shafts.

Figure 5:
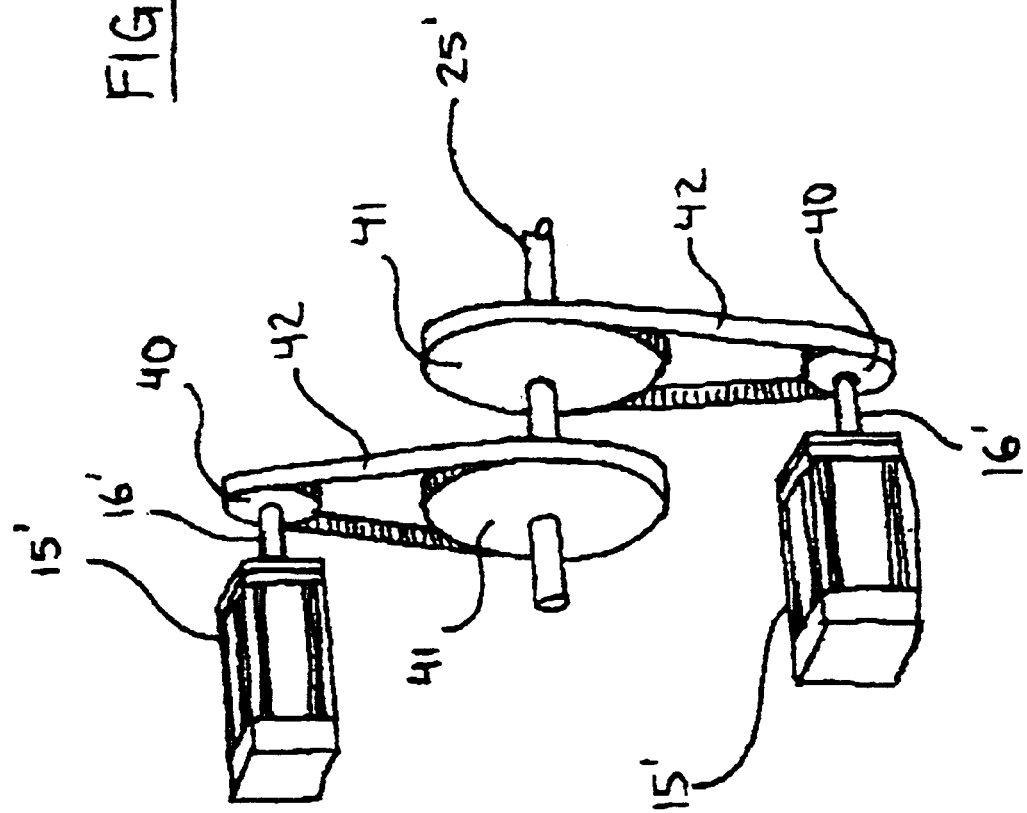
FIG. 5 schematically depicts an alternate exemplary arrangement combining multiple motors in accordance with the present invention.
Figure 6:
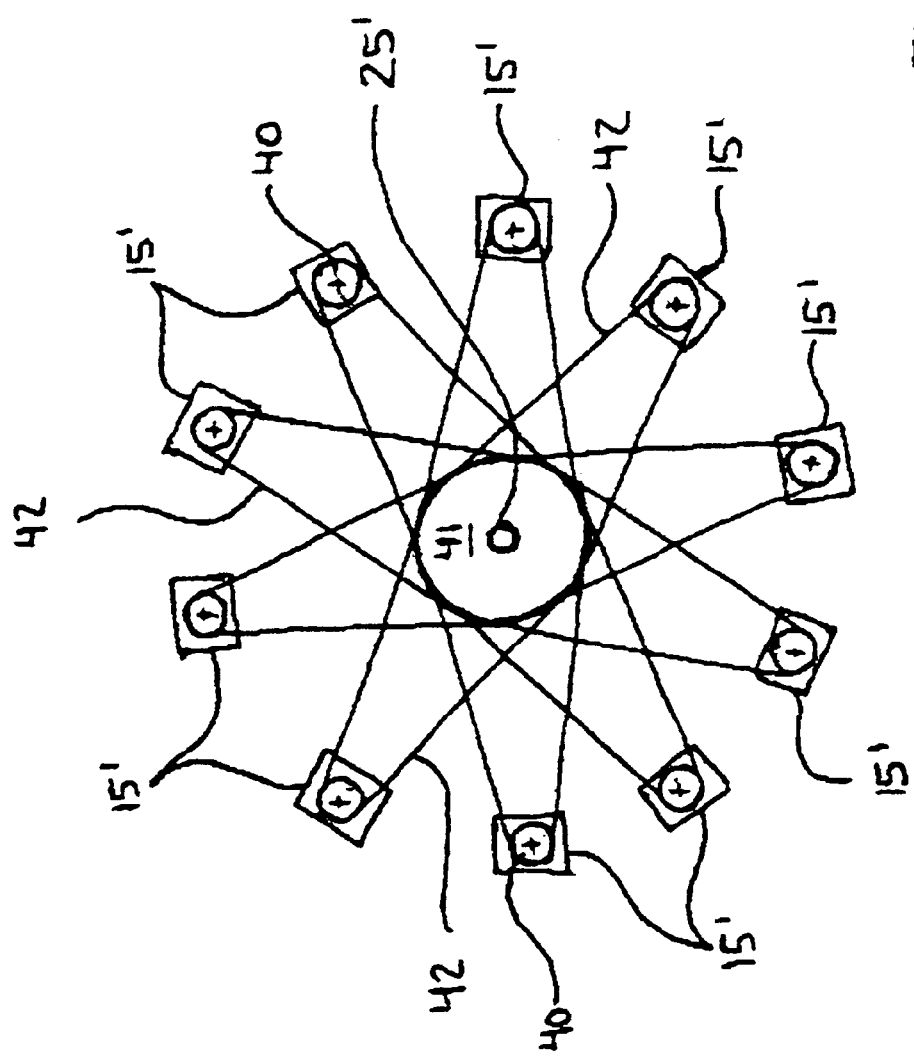
FIG. 6 shows the radial positioning of multiple motors about the common output shaft according to the motor arrangement of FIG. 5.

Such an alternative embodiment for combining plural motors is shown in FIGS. 5 and 6, wherein a plurality of motors 15' are operatively connected to and drive a common output shaft 25' by means of toothed pulleys and synchronous belts. Referring specifically to FIG. 5, the operative connection between two of the plurality of motors 15' to the common output shaft 25' is shown in detail. It will be understood that this illustrated arrangement is repeated along the length of the common output shaft 25' for each of the motors 15' in this alternative embodiment.

As depicted, each motor 15' is separately operatively coupled to the common output shaft 25' at a distinct position along the length of the shaft 25' by a belt and pulley assembly comprising a toothed pulley 40 provided on the motor's 15' output shaft 16', the pulley 40 driving a toothed pulley 41 provided on the common output shaft 25' via the belt 42 in a reduction gearing having a 2:1 ratio.

As shown diagrammatically in FIG. 6, the motors 15' are arranged radially about the common output shaft 25' in order to minimize loading on the common output shaft 10, and so to efficiently transfer the peak acceleration of the several motors 10 to the common output shaft.

It is of course desirable that the mechanical design for any system to efficiently combine plural motors in accordance with this invention reduce as far as possible the effective inertia apparent at the test article. This may be accomplished, for example, by using a large speed step-up ratio, and taking advantage of the physical law that inertia is reduced by the square of the step-up ratio.

An "efficient" combining system, within the meaning of this disclosure, may be understood as one where the overall performance of the combined plural motor system is greater than that of the single motor it replaces. With the benefit of this disclosure, it will be appreciated that the efficiency of the combining system is affected by the number of motors the system combines. The mechanical design of the system for combining plural motors may become so complex as to hinder overall system performance if the number of paralleled motors becomes too great; that is, the design of the combining system (including, for example, the control system required to synchronize the parallel control of larger and larger numbers of servo-controlled motors) may no longer efficiently translate the peak rate of acceleration of the smaller, plural motors to the motor-driven device. Without limitation to the claims, it is presently understood that the number of motors that may be efficiently paralleled in accordance with the method disclosed herein is in excess of 100.

Figure 7:
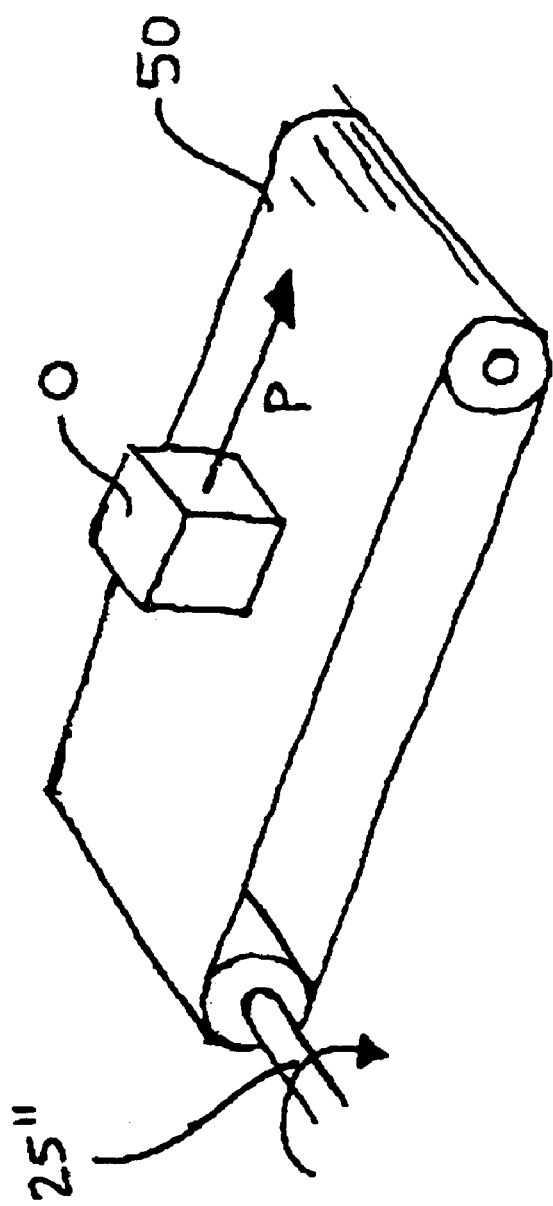
FIG. 7 schematically illustrates one exemplary operational environment for the method of the present invention.
Figure 8:
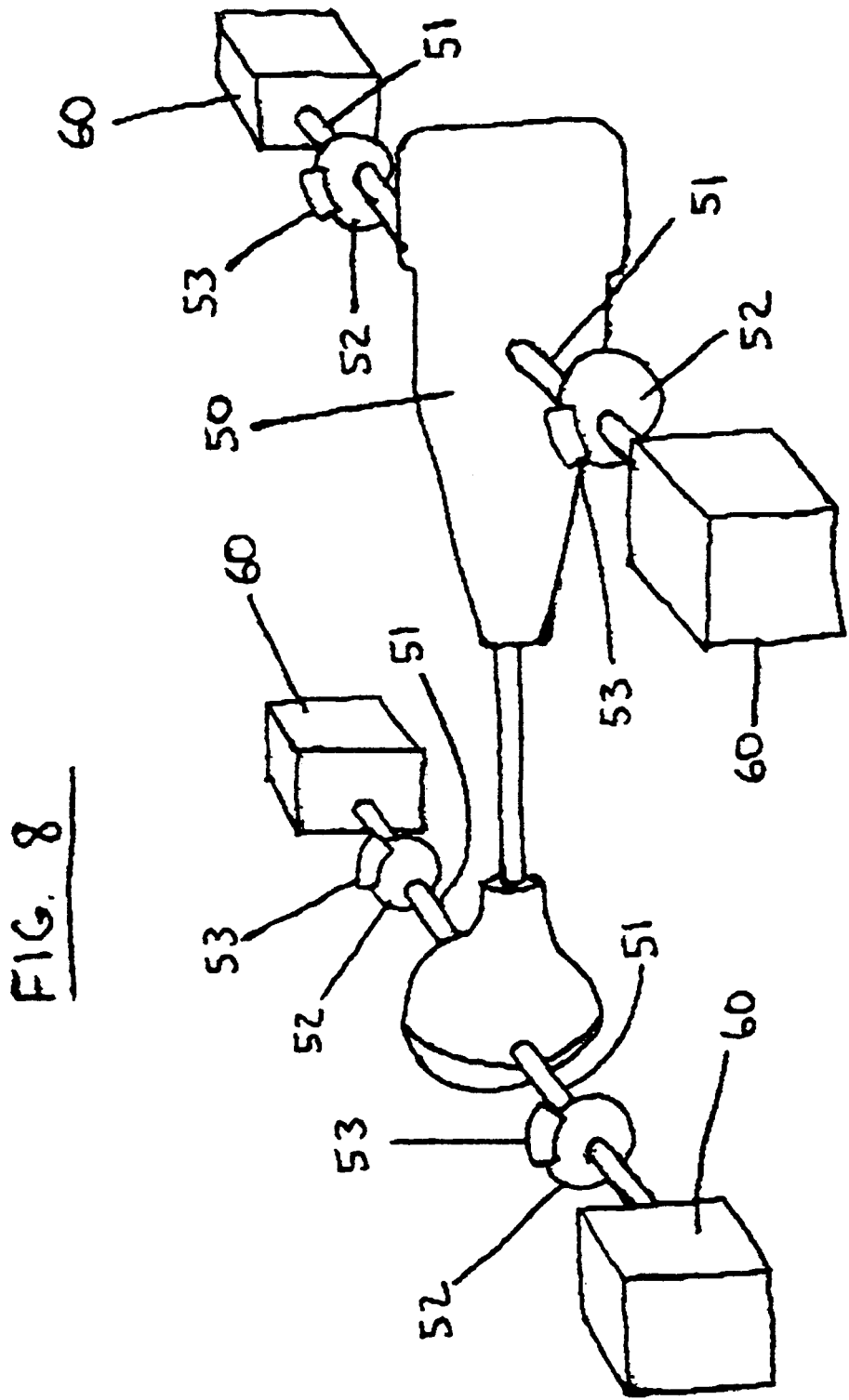
FIG. 8 schematically depicts a further exemplary operational environment for the method of the present invention.

Turning now to FIGS. 7 and 8, exemplary applications for the present inventive method are depicted.

With reference first to FIG. 7, a first exemplary application lies in industrial motion control, and in particular to the repeated movement of an object or objects (identified generically as O) from a first position to a second position along a path of travel P, for instance on a conveyor 50, where the object's motion is arrested before being moved to a second position. Without limitation, the object could be any item in an industrial assembly or production line, including a tool head, a liquid dispenser, the vacuum head of a robot pick-and-place system, etc.

For this exemplary embodiment the conventional servo-motors of Table II are employed. More particularly, ten motors (not shown in FIG. 7) commercially available from POWERTEC INDUSTRIAL MOTORS, Model No. E1184E2, are employed in place of a single larger servo-motor, Model No. E32DE2, also available commercially from POWERTEC INDUSTRIAL MOTORS. Each of the ten motors is characterized by about 10% of the power of the above-referenced single motor.

While the ten motors of this embodiment may be combined using any system that efficiently transfers the peak acceleration rate of the smaller motors to the motor-driven device through a common output shaft 25", including those means described hereinabove, for this exemplary embodiment the plural motors are shown to be combined using the reduction gear pulley and belt means previously described in reference to FIGS. 5 and 6.

According to the plural motor system so exemplified, and assuming a 95% gearing efficiency and a 20% increase in inertia attended by the pulley and belt combining system of the type employed, the performance resulting from the method of this invention may be characterized as shown in Table IV. From this Table IV it can be seen that the parallel motor arrangement of the method of this invention gives a small increase in power and speed, a slight reduction in inertia, but an almost 2.5 times increase in the peak rate of acceleration relative to a single, larger motor of comparable type.

TABLE IV

|  | Single motor | Combined Parallel Motors |
| --- | --- | --- |
| Speed (rpm) | 1750 | 1800 |
| Power (kW) | 286 | 346 |
| Peak Torque (nm) | 4041 | 8626 |
| Effective Inertia at Output Shaft (kg-m$^2$) | 0.9 | 0.772 |
| Acceleration Rate (rad/sec$^2$) | 4490 | 11,173 |

Of course, the final improvement in the motor-driven system by means of this invention is, in part, determined by taking into account the additional inertia of the load that needs to be controlled/manipulated; that is, the smaller the load inertia as compared to the motor inertia, the more significant the overall system improvement.

In yet a further modification of the foregoing embodiment, it is envisioned that at least some of the additional inertia overhead attributable to the system by the motor combining means may be eliminated if the multiple small motors are each directly coupled to the motor-driven device, rather than through a single, common output shaft.

Another application of the present inventive method, shown in FIG. 8, comprises a system for testing anti-lock brakes and/or anti-lock braking control systems, by driving axle and disk rotor assemblies via plural combined motors. More particularly, the system, illustrated schematically, shows a vehicle drive system 50 comprising a vehicle engine, trans-axle, and transmission operatively coupled to axles 51. On each axle 51 is provided a braking system including a brake disk 52 and brake caliper 53. Several plural combined motor systems (represented schematically at box 60), each comprising several smaller motors combined in a manner previously disclosed, are operatively coupled to a drive one of the axles 51 and the brake disk 52 associated therewith via the motor systems common output shaft.

By use of the inventive method in this exemplary application, the low inertia and quick acceleration attributable to this invention enables the test system to more correctly duplicate one wheel/axle locking up and spinning free as the brakes are pulsated, while yet enabling the delivery of both the high speed and torque needed to correctly emulate axle-loading under driving conditions. The advantages of employing the method of this invention over the use of a single, larger motor in this exemplary application are manifest by the inertia requirements of this motor-driven system. With too much inertia, the application of the brake calipers will not slow down the wheel at a rate that effectively simulates how a vehicle wheel might suddenly lock up under real-world driving conditions, such as when brakes are applied on an icy road surface.

Using six commercially available servo-motors, for example Model 1904CSJ, commercially available from MTS Systems Corporation, with a belt and pulley combining system such as described elsewhere herein, the performance resulting from the method of this invention may be characterized as shown in Table V.

TABLE V

| Specifications for Combined Parallel Motors | |
|---|---|
| Continuous motoring power: | 210 kw |
| Continuous absorbing power: | 230 kw |
| Peak motoring/absorbing power: | 500 kw |
| Base speed: | 1100 rpm |
| (Est. road speed with 0.3 m RR): | (125 km/hr) |
| Maximum speed: | 1400 rpm |
| Continuous torque (to base speed): | 1800 nm |
| Mechanical inertia: | 0.5–0.6 kg-m$^2$ |
| Peak acceleration rate: | 7000–8000 rad/sec$^2$ |
| Peak torque: | 4000 nm |

In still another exemplary application, the method of this invention is employed in a motor-driven system for testing automobile transmissions in high-performance vehicles, such as FORMULA ONE race cars. Due to the demanding performance required from such transmissions in real-world operating conditions, it is conventionally impossible to satisfy the transmission testing requirements through the use of a single, large motor, for instance a servo-electric motor.

The system of this application particularly employs an efficient paralleling gearbox like that described above in relation to FIGS. 2 and 3 to combine twenty, eight-inch servo-motors of the type commercially available from MTS Systems Corporation, Model 1904CSJ, through a common output shaft coupled to the vehicle engine to serve as the prime mover therefor. The improved performance resulting from the method of this invention may be characterized as shown in Table VI.

TABLE VI

| Specifications for Combined Parallel Motors | |
|---|---|
| Power: | 900 HP (670 kW) continuous |
| Maximum Speed: | 24,000 rpm |
| Base Speed: | 19,000 rpm |
| Mean Torque: | 250 lb-ft (330 nm) |
| Effective Inertia at test article | 0.03 kg-m2 |
| Torque Control Response: | <1 millisecond for 100% torque change |
| Expected Max. Acceleration: | 200,000 to 250,000 rpm/sec (15k–25k rad/sec2) |

Of course, the foregoing is merely illustrative of the present invention, and several applications therefor. Those of ordinary skill in the art will appreciate that many additions and modifications to the present invention, as set out in this disclosure, are possible without departing from the spirit and broader aspects of this invention as defined in the appended claims.

The invention in which an exclusive property or privilege is claimed is defined as follows:

1. In a method for testing the performance of a mechanical device, wherein a single motor characterized by a first power, a first rotational inertia, and a first peak rate of acceleration is provided to simulate a load or prime mover for the mechanical device to be tested, the improvement comprising the step of providing at least two motors in place of the single motor, the at least two motors having a combined power that is at least equivalent to the first power of the single motor, and a combined rotational inertia that is less than the rotational inertia of the first motor, and wherein further the at least two motors are operatively coupled in parallel to produce a combined second peak rate of acceleration greater than the first peak rate of acceleration.

2. The method of claim 1, wherein the method for testing the performance of a mechanical device comprises a method for testing a motor-vehicle transmission wherein the single motor characterized by a first power, a first rotational inertia, and a first peak rate of acceleration is provided to simulate a prime mover for the motor-vehicle transmission to be tested, and wherein the improvement comprises the step of providing the said at least two motors in place of the single motor to simulate the prime mover for the motor-vehicle transmission.

3. The method of claim 1, wherein the method for testing the performance of a mechanical device comprises a method for testing motor-vehicle brakes wherein the single motor characterized by a first power, a first rotational inertia, and a first peak rate of acceleration is provided to simulate a load for the motor-vehicle brakes to be tested, and wherein the improvement comprises the step of providing the said at least two motors in place of the single motor to simulate the load for the motor-vehicle brakes.

4. In an apparatus for testing the performance of a mechanical device, wherein a single motor characterized by a first power, a first rotational inertia, and a first peak rate of acceleration is provided to simulate a load or prime mover for the mechanical device to be tested, the improvement comprising substituting at least two motors in place of the single motor, the at least two motors having a combined power that is at least equivalent to the first power of the single motor, and a combined rotational inertia that is less than the rotational inertia of the first motor, and wherein further the at least two motors are operatively coupled in parallel to produce a combined second peak rate of acceleration greater than the first peak rate of acceleration.

5. The improved apparatus of claim 4, wherein the apparatus for testing the performance of a mechanical device comprises an apparatus for testing a motor-vehicle transmission wherein the single motor characterized by a first power, a first rotational inertia, and a first peak rate of acceleration is provided to simulate a prime mover for the motor-vehicle transmission to be tested, and wherein the improvement comprises substituting the said at least two motors in place of the single motor to simulate the prime mover for the motor-vehicle transmission.

6. The improved apparatus of claim 4, wherein the apparatus for testing the performance of a mechanical device comprises an apparatus for testing motor-vehicle brakes wherein the single motor characterized by a first power, a first rotational inertia, and a first peak rate of acceleration is provided to simulate a load for the motor-vehicle brakes to be tested, and wherein the improvement comprises substituting the said at least two motors in place of the single motor to simulate the load for the motor-vehicle brakes.

* * * * *